United States Patent
Kolk

(10) Patent No.: US 7,364,353 B2
(45) Date of Patent: Apr. 29, 2008

(54) DYNAMIC CORRECTION OF SENSED TEMPERATURE

(75) Inventor: Richard Allen Kolk, Glastonbury, CT (US)

(73) Assignee: Carrier Corporation, Farmington, CT (US)

( * ) Notice: Subject to any disclaimer, the term of this patent is extended or adjusted under 35 U.S.C. 154(b) by 203 days.

(21) Appl. No.: 11/180,383

(22) Filed: Jul. 13, 2005

(65) Prior Publication Data

US 2006/0165149 A1 Jul. 27, 2006

Related U.S. Application Data

(60) Provisional application No. 60/647,095, filed on Jan. 26, 2005.

(51) Int. Cl.
G01K 15/00 (2006.01)
G01C 25/00 (2006.01)

(52) U.S. Cl. .............................. 374/1; 702/99; 702/104

(58) Field of Classification Search .................... 374/1; 702/99, 104
See application file for complete search history.

(56) References Cited

U.S. PATENT DOCUMENTS

| 4,607,530 | A | * | 8/1986 | Chow ........................... 73/708 |
| 4,741,476 | A | * | 5/1988 | Russo et al. ............... 236/46 R |
| 4,836,442 | A | * | 6/1989 | Beckey ...................... 236/46 R |
| 5,199,637 | A | * | 4/1993 | Adams ....................... 236/78 R |
| 5,255,975 | A | * | 10/1993 | Adams ........................... 374/1 |
| 5,586,061 | A | * | 12/1996 | Williams et al. ............ 702/130 |
| 5,974,434 | A | | 10/1999 | Rose |
| 6,435,418 | B1 | | 8/2002 | Toth et al. |
| 6,739,145 | B2 | | 5/2004 | Bhatnagar |
| 6,823,253 | B2 | | 11/2004 | Brunell |
| 2006/0060658 | A1 | * | 3/2006 | Proffitt et al. ............... 236/1 C |
| 2006/0074586 | A1 | * | 4/2006 | Kautz et al. ................ 702/130 |

* cited by examiner

*Primary Examiner*—Gail Verbitsky
*Assistant Examiner*—Mirellys Jagan
(74) *Attorney, Agent, or Firm*—Marjima Muldoon Blasiak & Sullivan

(57) ABSTRACT

A thermostat (10) for sensing the ambient temperature in an environment includes an enclosure (100) housing a temperature sensor (20) for sensing the temperature within the enclosure, a temperature display device (30), a liquid crystal display (LCD) backlight (40) operative in its on state to illuminate the temperature display. A controller (50) operatively associated with the thermostat monitors the current on/off state of the backlight and the length of time the backlight has been in its current state, estimates a temperature correction factor using a simplified Discrete Kalman Filter estimator, and applies the temperature correction factor to correct the sensed temperature for the heat generated by the backlight (40).

12 Claims, 1 Drawing Sheet

DYNAMIC CORRECTION OF SENSED TEMPERATURE

CROSS-REFERENCE TO RELATED APPLICATION

This application claims priority to and the benefit of U.S. Provisional Patent Application Ser. No. 60/647,095, filed Jan. 26, 2005, and entitled DYNAMIC CORRECTION OF SENSED TEMPERATURE, which application is incorporated herein by this reference.

BACKGROUND OF THE INVENTION

The present invention relates generally to the correction of the temperature displayed by a device and, more particularly, to the correction of the displayed temperature due to the effects of heat generated by a liquid crystal display (LCD) backlighting the display.

In certain applications, including in commercial heating, ventilating and air conditioning (HVAC) systems, temperature display devices, such as for example thermostats, are employed that display the sensed temperature on a display screen. Often, the display screens are backlighted with an LCD to improve illumination. Typically, the temperature sensor is housed in the same enclosure with the display screen and the LCD backlight. The heat generated by the LCD backlighting effects the temperature within the enclosure, resulting in the temperature sensor transmitting a temperature to be displayed that is not the true temperature of the environment being monitored and serviced by the HVAC system. In HVAC applications, the displayed temperature on an LCD backlighted temperature sensing device may incorrectly reflect the true sensed temperature of the room in which the device is disposed by as much as 5 degrees F.

Further, the temperature signal from the temperature sensor is commonly transmitted not only to the display screen, but also to the HVAC system controller. Therefore, if the temperature signal received by the HVAC controller does not represent the true temperature of the environment with which the HVAC system is associated, but rather represents an incorrect temperature due to the effects of heat from the LCD backlighting, the HVAC system will overcompensate or undercompensate in response to the received temperature signal. In either case, system efficiency is decreased and the comfort of individuals within the environment associated with the HVAC system is less than optimal.

SUMMARY OF THE INVENTION

In one aspect of the invention, a method is provided for correcting a temperature signal from a temperature sensor for sensing an ambient temperature in an environment wherein the sensor may be affected by a local heating/cooling source. The method includes determining whether the local heating/cooling source is in an on or an off state, monitoring the length of time, either continuously or at selected time intervals, the local heating/cooling source has been in its current on/off state, estimating a temperature correction factor based upon the current on/off state of the local heating/cooling source and the length of time that the heating/cooling source has been in its current on/off state, and applying the temperature correction factor to the sensed temperature to correct the sensed temperature for any effect from the local heating/cooling source whereby the corrected temperature more accurately reflects the ambient temperature of the environment. Advantageously, the temperature correction factor is estimated using a simplified Discrete Kalman Filter analysis and the temperature correction factor is dynamically applied to the sensed temperature.

In another aspect of the invention, a method is provided for correcting a sensed temperature for display on a temperature display device, the device having a liquid crystal backlight. The sensed temperature is received from a temperature sensor that may be affected by heat generated from the liquid crystal backlight. The method includes determining whether the backlight is in an on state or an off state, monitoring the length of time, either continuously or at selected time intervals, the backlight has been in its current on/off state, estimating a temperature correction factor based upon the current on/off state of the backlight and the length of time the backlight has been in its current on/off state, and applying that temperature correction factor to the sensed temperature prior to displaying the temperature. The method provides a dynamic estimation of a temperature correction factor and summing the estimated temperature correction factor with the currently sensed temperature to generate a corrected display temperature that is indicative of the true temperature in the environment uncorrupted by the effects of heat from the backlight. Advantageously, the temperature correction factor is estimated using a simplified Discrete Kalman Filter analysis and the temperature correction factor is dynamically applied to the sensed temperature.

In a still further aspect of the invention, a thermostat is provided for sensing the ambient temperature in an environment. The thermostat has an enclosure housing a temperature sensor, a temperature display, and a liquid crystal backlight. The liquid crystal backlight is operative in its on state to illuminate the temperature display. When in its on state, the backlight emits heat into the enclosure. The temperature sensor is operative to generate a sensed temperature signal indicative of the temperature within the enclosure. The controller receives the sensed temperature from the temperature sensor, monitors the current on/off state of the backlight and the length of time of the backlight in its current on/off state, and dynamically estimates a temperature correction factor using a simplified Discrete Kalman Filter estimator. The controller applies the temperature correction factor to the sensed temperature to adjust the sensed temperature signal and generate a corrected temperature indicative of the true temperature of the environment without corruption from the heat of the backlight.

The temperature correction factor may be estimated using a simplified Discrete Kalman Filter analysis may in accord with the relationship:

$$\Delta T_{BL}(t) = -0.00075(\Delta T_{BL}(t)) + 0.001425(u_{BL}(t));$$

where:

$\Delta T_{BL}(t)$ is a time incremental function representing the temperature change due to the backlight effect; and $u_{BL}(t)$ is a function of the backlight status, equal to 1 if backlight 40 is on and equal to 0 if backlight 40 is off; and the sensed temperature corrected in accord with the relationship:

$$T(t)=T_{raw}(t)-\Delta T_{BL}(t)$$

where:

$T(t)$ is the corrected temperature, degrees F;

$T_{raw}(t)$ is the sensed temperature, degrees F.

DETAILED DESCRIPTION OF THE INVENTION

The invention will be described herein with reference to a temperature sensing and display device, commonly known as a thermostat, as applied to a heating, ventilating and air conditioning system. It is to be understood, however, that the basic concept of the present invention may be applied for the correction of any sensed temperature that has been corrupted by the presence of a local heat source or cooling source.

Figure 1:
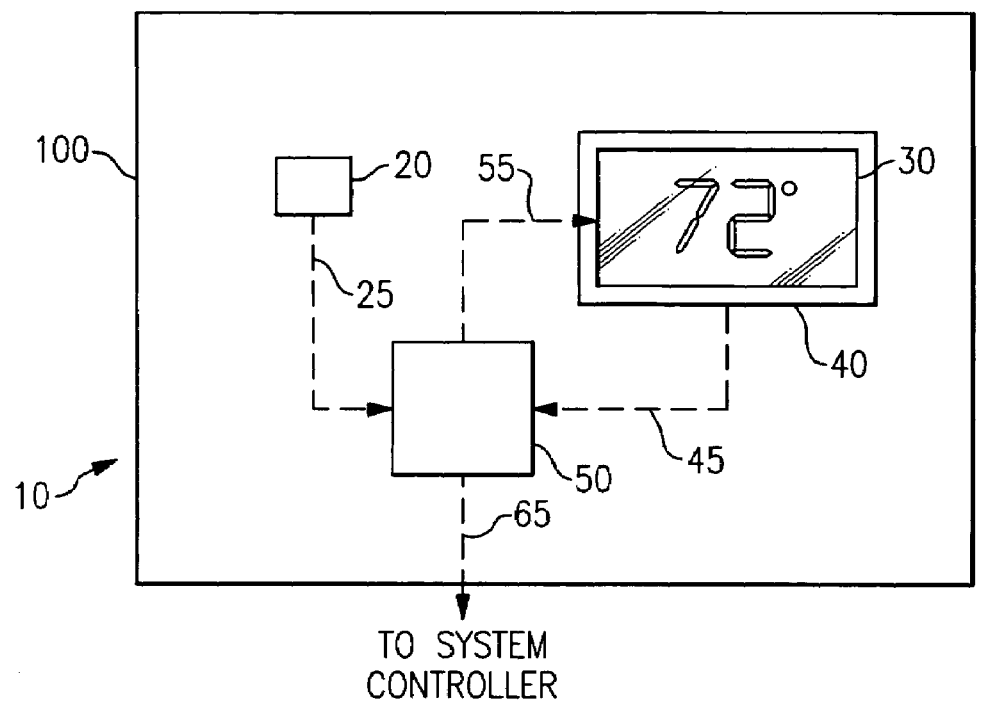
FIG. 1 is a diagram illustrating a thermostat employing a basic aspect of the invention.

Referring now to FIG. 1, the thermostat 10 includes a temperature sensor 20, a temperature display device 30, a liquid crystal display (LCD) backlight 40 and a controller 50, all housed in a common enclosure 100. The temperature display device 30 functions in a conventional manner to display a temperature corresponding to a temperature signal 55 received from the controller 50. The LCD backlight 40 is provided in operative association with the temperature display device 30 to backlight the display device 30, thereby improving the illumination of the display device.

The function of the temperature sensor 20 is to sense the temperature of the local environment external of the enclosure 100, that is the environment associated with and controlled by the HVAC system (not shown). The particular type of temperature sensor employed is not relevant to the invention. In a conventional manner, the temperature sensor 20 generates a temperature signal 25 indicative of the sensed temperature and transmits that temperature signal to the controller 50.

In operation, the LCD backlight 30 may be on for varying periods of time and off for varying periods of time. When the LCD backlight 40 is on, heat generated in the light production process is emitted from the LCD backlight. As a result of the heat being emitted into the common enclosure 100, the temperature sensed by the temperature sensor 20 is corrupted as it does not accurately reflect the true temperature of the environment exterior to the enclosure 100. However, when the LCD backlight 40 is turned off for a period of time sufficient for the temperature interior of the enclosure 100 to come to an equilibrium with the temperature exterior to the enclosure 100, the sensed temperature does indeed reflect the true temperature of environment exterior of the enclosure 100.

To compensate for the rise in sensed temperature caused by the heat emitted into the enclosure 100 by the LCD backlight 40, the controller 50 estimates a correction factor based on a simplified Discrete Kalman Filter analysis and dynamically corrects the temperature signal 25 received from the temperature sensor 20 accordingly. After applying the generated correction factor to the sensed temperature derived from the temperature signal 25, the controller 50 generates the temperature signal 55 and transmits the temperature signal 55 indicative of the corrected temperature to both the temperature display device 30 and an HVAC system controller (not shown).

In operation, the controller 50 monitors the on/off status of the LCD backlight 40, and, either continuously or at selected time intervals, as desired, receives a backlight on/off status signal 45. The controller also receives the temperature signal 25 from the temperature sensor 20, again either continuously or at selected time intervals coordinated with the backlight on/off status signal 45. With both the sensed temperature signal 25 and the backlight on/off status signal 45 present, the controller 50 estimates a correction factor that is summed with the sensed temperature signal to generate the temperature signal 55 that represents the corrected temperature without corruption from heat from the backlight 40.

In another aspect of the invention, the controller 20 dynamically calculates the correction factor using a simplified Discrete Kalman Filter analysis in accord with the following formulas:

$$T(t)=T_{raw}(t)-\Delta T_{BL}(t); \text{ and}$$

$$\Delta T_{BL}(t)=-0.00075(\Delta T_{BL}(t))+0.001425(u_{BL}(t));$$

where:

$T(t)$ is the corrected temperature, degrees F $T_{raw}(t)$ is the sensed temperature, degrees F $\Delta T_{BL}(t)$ is a time incremental function, also referred to as the correction factor, representing the temperature change due to the backlight effect; and $u_{BL}(t)$ is a function of the backlight status, =1 if backlight 40 is on =0 if backlight 40 is off.

The value of the time incremental function $\Delta T_{BL}(t)$ depends on the on/off status of the backlight 40 and also upon the time that the backlight has been continuously on or off.

The time incremental function $\Delta T_{BL}(t)$ is used by the controller 50 to estimate the temperature correction factor to be summed with the sensed temperature 25 to generate the corrected temperature signal 55.

To develop the function $\Delta T_{BL}(t)$ for a particular device, such as thermostat 10, the device is operated without any temperature correction being applied to the sensed temperature signal 25 and with the backlight 40 being cycled through off/on/off/on operation to provide a data trace 75 of sensed temperature over temperature. This data trace 75 is then compared to a similar data trace 85 obtained from an identical sensor except without any backlighting on, and therefore unaffected by the heat from the backlight 40 and representative of the true temperature. For illustration purposes, a comparison of representative data traces 75 and 85 is shown in FIG. 2.

Figure 2:
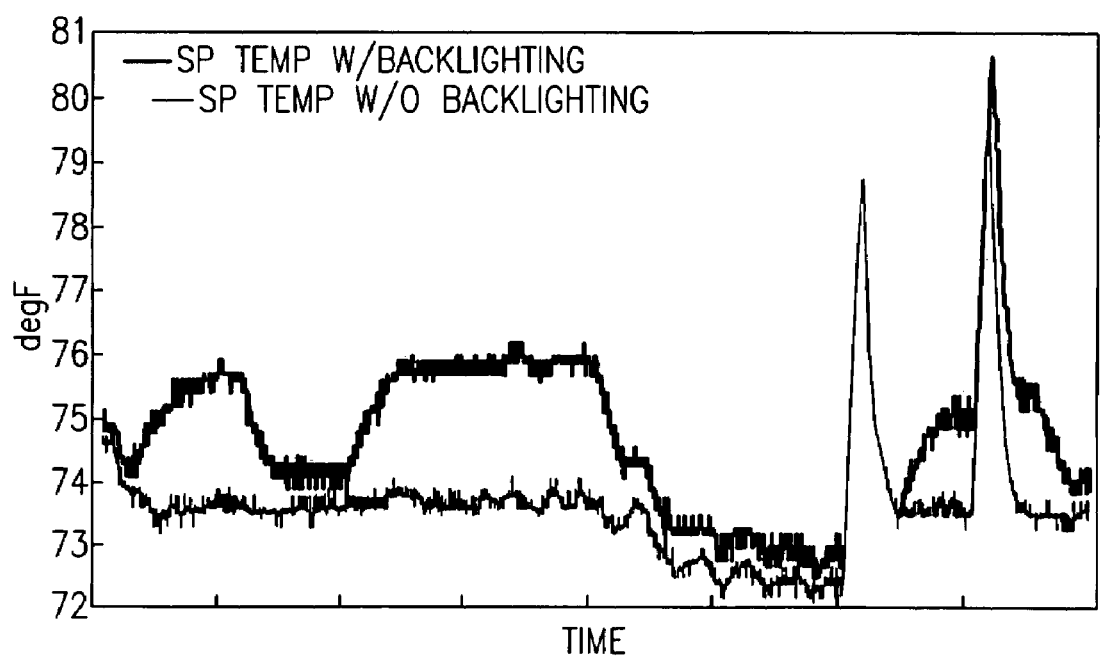
FIG. 2 is a chart showing representative temperature to time traces for uncorrected sensed temperature and true temperature.

To facilitate a Discrete Kalman Filter analysis, the following model was selected to represent the displayed temperature behavior as exemplified by the data trace 75 shown in FIG. 2.

$$T_{true}(t) = T_{nominal}(t) + \epsilon_1(t); \qquad \text{Eq. 1}$$

$$\Delta T_{BL}(t) = -0.00075(\Delta T_{BL}(t)) + 0.001425(u_{BL}(t)) + \epsilon_2(t); \qquad \text{Eq. 2}$$

$$T_{disp}(t) = T_{true}(t) + \Delta T_{BL}(t) + \epsilon_3(t); \qquad \text{Eq. 3}$$

where:

$T_{true}(t)$ is the true temperature, degrees F $\epsilon_1(t)$ is the normally distributed temperature noise associated with sensor temperature fluctuations;

$\Delta T_{BL}(t)$ is a time incremental function representing the temperature change due to the backlight effect;

$u_{BL}(t)$ is a function of the backlight status, =1 if backlight 40 is on

=0 if backlight 40 is off.

$\epsilon_2(t)$ is the normally distributed temperature noise associated with backlight temperature fluctuations;

$T_{disp}(t)$ is the displayed temperature, degrees F $\epsilon_3(t)$ is the normally distributed display temperature noise associated with backlight temperature fluctuations and other effects.

Equation 1 represents the true temperature of the environment as a constant nominal value plus noise. For purposes of this analysis, a nominal value of 72 degrees F. with a 5 degree F. variation symmetric about the nominal value was assumed to accommodate day and night temperature variations for a typical thermostat application. Further, assuming the variation to be normally distributed enables $\epsilon_1(t)$ to be defined as a random process with zero mean, a standard deviation of $\sigma=5$, and a variance computed as $\sigma^2_{\epsilon 1}=25$.

Equation 2 represents the backlight effect on display temperature behavior. The two numerical coefficients were calculated from the data traces shown in FIG. 2. The noise signal, $\epsilon_2(t)$, was also estimated from the data by first selecting a time range where the backlighting was on, calculating the mean value, subtracting the mean to produce a zero mean random process, and finally calculating the variance of the random process numerically as $\sigma^2_{\epsilon 2}=0.1443$.

Equation 3 defines the displayed temperature as the sum of the true temperatures plus the backlight temperature correction plus a noise signal. The noise signal, $\epsilon_3(t)$, was estimated from the data by first selecting a time range where the backlighting was on, calculating the mean value, subtracting the mean to produce a zero mean random process, and finally calculating the variance of the random process numerically as $\sigma^2_{\epsilon 3}=0.1443$.

With this information, a Discrete Kalman Filter analysis was applied to the system equations 1 through 3. The systems equations were discretized using a bilinear transform using an update time of 1 second, i.e. $\Delta T=1$.

$$T_{k+1} = T_k + \epsilon_{1k}; \qquad \text{Eq. 4}$$

$$\Delta T_{BL/k+1} = 0.99925(\Delta T_{BL/k}) + 0.0014254(u_{BL\ k}) + \epsilon_{2k}; \qquad \text{Eq. 5}$$

$$T_{disp\ k} = T_k + \Delta T_{BL\ k} + \epsilon_{3k}. \qquad \text{Eq. 6}$$

With the realization that the Kalman gain vector elements are approximately 1 and 0, respectfully, a simplified Discrete Kalman Filter analysis is applied executing only the state predictor and state corrector calculations. The covariance and gain calculations do not need to be made because they stabilize to constant values rapidly. The resulting difference equation for the true temperature becomes:

$$T_{k+1/k+1} = T_{k/k} + 0.99146(T_{raw\ k} - T_{k/k} - \Delta T_{BL/k}). \qquad \text{Eq. 7}$$

Applying a bilinear transform to Eq. 7, coverts it to the following differential equation:

$$1.00854 \dot{T}(t) = -1.9829 T(t) + 1.9829\ T_{raw}(t) - 1.9829 \Delta T_{BL}(t). \qquad \text{Eq. 8}$$

Recalling that the backlighting temperature correction behavior, presented in Eq. 2, can be estimated as:

$$\Delta \dot{T}_{BL}(t) = -0.00075 \Delta T_B(t) + 0.001425 u_{BL}(t). \qquad \text{Eq. 9}$$

Observing that the time constants in Eq. 8 and 9 are separated by over 3 orders of magnitude, it is permissible to consider Eq. 8 as having reached steady state equilibrium, while Eq. 9 is still in a dynamic range. Therefore, in steady state, Eq. 8 can be written as $$0 = -1.9829 T(t) + 1.9829 T_{raw}(t) - 1.9829 \Delta T_{BL}(t); \text{ which can be rewritten as:}$$

$$T(t) = T_{raw}(t) - \Delta T_{BL}(t). \qquad \text{Eq. 10}$$

Equations 9 and 10 form a set of the simplified filter equations that when programmed into the controller 50 permit the controller 50 to dynamically correct the raw temperature sensed by the temperature sensor 20 for the effects of backlighting whereby the temperature displayed on the temperature display 30 of the thermostat 10, will reflect the true temperature of the environment associated with the HVAC system.

While the invention has been described in connection with a thermostat in an HVAC System, it is to be understood that those skilled in the art will recognize that the invention may be applied to other temperature display devices in other applications within the spirit and scope of the present invention.

The invention claimed is:

1. A method for correcting a temperature signal from a temperature sensor for sensing an ambient temperature in an environment wherein the sensor may be affected by a local heating/cooling source, the method comprising:

determining whether the local heating/cooling source is in an on or an off state;

monitoring the length of time the local heating/cooing source has been in its current on/off state;

estimating a temperature correction factor based upon the current on/off state of the local heating/cooling source and the length of time that the heating/cooling source has been in its current on/off state using a simplified Discrete Kalman Filter analysis in accord with the relationship:

$$\Delta \dot{T}_{BL}(t) = -0.00075(\Delta T_{BL}(t)) + 0.001425(u_{BL}(t));$$

where:
- $\Delta T_{BL}(t)$ is a time incremental function representing the temperature change due to the backlight effect; and
- $u_{BL}(t)$ is a function of the backlight status, equal to 1 if backlight 40 is on and equal to 0 if backlight 40 is off; and applying said temperature correction factor to the sensed temperature to correct the sensed temperature for any effect from the local heating/cooling source whereby the corrected temperature more accurately reflects the ambient temperature of the environment.

2. A method as recited in claim 1 wherein the step of monitoring the length of time the local heating/cooling source has been in its current on/off state comprises continuously monitoring the on/off state of the local heating/cooling source.

3. A method as recited in claim 1 wherein the step of monitoring the length of time the local heating/cooling source has been in its current on/off state comprises monitoring the on/off state of the local heating/cooling source at selected time intervals.

4. A method as recited in claim 1 wherein the step of applying said correction factor comprises dynamically correcting the sensed temperature in accord with the relationship:

$$T(t)=T_{raw}(t)-\Delta T_{BL}(t)$$

where:
- T(t) is the corrected temperature, degrees F;
- $T_{raw}(t)$ is the sensed temperature, degrees F.

5. A method of correcting a sensed temperature for display on a display illuminated by a backlight, the sensed temperature being received from a temperature sensor that may be affected by heat generated from a liquid crystal backlight, the method comprising:
- determining whether the backlight is in an on state or an off state;
- monitoring the length of time the backlight has been in its current on/off state;
- estimating a temperature correction factor based upon the current on/off state of the backlight and the length of time the backlight has been in its current on/off state; and
- applying said temperature correction factor to the sensed temperature prior to displaying the temperature.

6. A method as recited in claim 5 wherein the step of monitoring the length of time the backlight has been in its current on/off state comprises continuously monitoring the on/off state of the backlight.

7. A method as recited in claim 5 wherein the step of monitoring the length of time the backlight has been in its current on/off state comprises monitoring the on/off state of the backlight at selected time intervals.

8. A method as recited in claim 5 wherein the step of estimating a temperature correction factor comprises estimating the temperature correction factor using a simplified Discrete Kalman Filter analysis.

9. A method as recited in claim 8 wherein the step of applying said temperature correction factor to the sensed temperature comprises dynamically applying the said temperature correction factor to the sensed temperature.

10. A method as recited in claim 5 wherein the step of estimating a temperature correction factor comprises using a simplified Discrete Kalman Filter analysis in accord with the relationship:

$$\Delta T_{BL}(t)=-0.00075(\Delta T_{BL}(t))+0.001425(u_{BL}(t));$$

where:
- $\Delta T_{BL}(t)$ is a time incremental function representing the temperature change due to the backlight effect; and
- $u_{BL}(t)$ is a function of the backlight status, equal to 1 if backlight 40 is on and equal to 0 if backlight 40 is off.

11. A method as recited in claim 10 wherein the step of applying said correction factor comprises dynamically correcting the sensed temperature in accord with the relationship:

$$T(t)=T_{raw}(t)-\Delta T_{BL}(t)$$

where:
- T(t) is the corrected temperature, degrees F;
- $T_{raw}(t)$ is the sensed temperature, degrees F.

12. A thermostat for sensing the ambient temperature in an environment; comprising
- an enclosure disposed within the environment, the enclosure having a temperature therewithin;
- a temperature sensor housed within the enclosure, said temperature sensor operative to generate a sensed temperature signal indicative of the temperature within the enclosure;
- a temperature display housed within the enclosure;
- a liquid crystal backlight housed within the enclosure in operative association with the temperature display, said backlight having an on state and an off state, said backlight emitting heat into the enclosure when the backlight is in the on state; and
- a controller operatively associated with said temperature sensor and said temperature display, said controller receiving the sensed temperature from said temperature sensor, said controller operative to monitor the current on/off state of the backlight and the length of time of the backlight in its current on/off state, to dynamically estimate a temperature correction factor using a simplified Discrete Kalman Filter analysis, to correct the sensed temperature by applying the temperature correction factor to the sensed temperature, and to transmit the corrected temperature to said temperature display.

* * * * *